United States Patent
Torres Esteban et al.

(10) Patent No.: US 11,752,704 B2
(45) Date of Patent: Sep. 12, 2023

(54) COMPOSITE LAMINATE FOR AN AIRFRAME LIFTING SURFACE AND METHOD FOR MANUFACTURING THEREOF

(71) Applicant: AIRBUS OPERATIONS S.L., Madrid (ES)

(72) Inventors: Antonio Torres Esteban, Madrid (ES); Jose-Maria Blanco-Saiz, Madrid (ES); Manuel Recio Melero, Madrid (ES); Pedro Nogueroles Viñes, Toled (ES)

(73) Assignee: AIRBUS OPERATIONS S.L., Madrid (ES)

( * ) Notice: Subject to any disclaimer, the term of this patent is extended or adjusted under 35 U.S.C. 154(b) by 260 days.

(21) Appl. No.: 17/075,211

(22) Filed: Oct. 20, 2020

(65) Prior Publication Data

US 2021/0122454 A1    Apr. 29, 2021

(30) Foreign Application Priority Data

Oct. 23, 2019  (EP) .................................... 19382922

(51) Int. Cl.
| | |
|---|---|
| *B29C 70/20* | (2006.01) |
| *B29C 65/48* | (2006.01) |
| *B29C 65/00* | (2006.01) |
| *B29C 70/30* | (2006.01) |
| *B64C 1/00* | (2006.01) |
| *B32B 5/12* | (2006.01) |
| *B32B 5/26* | (2006.01) |
| *B29L 31/30* | (2006.01) |

(52) U.S. Cl.
CPC ............ *B29C 70/202* (2013.01); *B29C 65/48* (2013.01); *B29C 66/721* (2013.01); *B29C 70/30* (2013.01); *B32B 5/12* (2013.01); *B32B 5/26* (2013.01); *B64C 1/00* (2013.01); *B29L 2031/3076* (2013.01); *B64C 2001/0072* (2013.01)

(58) Field of Classification Search
CPC ............ B29C 70/202; B32B 5/12; B32B 5/26
See application file for complete search history.

(56) References Cited

U.S. PATENT DOCUMENTS

| | | | |
|---|---|---|---|
| 2006/0222837 A1 | 10/2006 | Kismarton | |
| 2012/0148788 A1* | 6/2012 | Paul ...................... | B29C 70/506 428/107 |
| 2015/0239207 A1* | 8/2015 | Selyugin ................ | B64C 3/185 428/113 |
| 2017/0057615 A1* | 3/2017 | Charles ................... | B32B 3/18 |

OTHER PUBLICATIONS

Extended Search Report for EP 19382922-3, dated Apr. 23, 2020, 10 pages.

* cited by examiner

*Primary Examiner* — Scott W Dodds
(74) *Attorney, Agent, or Firm* — Nixon & Vanderhye P.C.

(57) ABSTRACT

A composite laminate (2) for an airframe lifting surface comprising a set of stacked plies (10) of pre-preg material, the composite laminate (2) being surrounded by at least an edge (3) following an edge direction E along the composite laminate (2), the set of stacked plies (10) including: a first plurality (4) of plies (4.1) formed by tapes arranged parallel to the edge direction E, and a second plurality (5) of plies (5.1, 5.2, 5.3) formed by tapes arranged in a direction different to the edge direction E, wherein the thickness of at least one ply of the second plurality (5) of plies is lower than the thickness of each ply of the first plurality (4) of plies.

15 Claims, 3 Drawing Sheets

COMPOSITE LAMINATE FOR AN AIRFRAME LIFTING SURFACE AND METHOD FOR MANUFACTURING THEREOF

RELATED APPLICATION

This application claims priority to European Patent Application 19382922-3 filed Oct. 23, 2019, the entirety of which is incorporated by reference.

TECHNICAL FIELD

The present invention belongs to the field of manufacturing composite parts, and particularly, the invention provides a composite laminate for an airframe lifting surface and a method for manufacturing thereof. The invention may be embodied to provide an advanced composite laminate for an airframe lifting surface by means of high deposition pre-preg materials technology.

BACKGROUND

A composite airframe lifting surface is typically composed by a skin, such as a composite laminate skin which is stiffened, such as by a torsion box. The lifting surface may be wings, horizontal and/or vertical tail planes, rudders, elevator, ailerons, spoilers and flaps.

Typically, these composite airframe lifting surfaces are manufactured with standard pre-preg materials by means of Automated Fibre Placement (AFP) or Automated Tape Laying (ATL). In both methods, the lay-up process needs a high volume of labour hours even though the process is automated. Furthermore, according to a high production rate scenario, a big investment is needed in terms of machines and shop floor to compensate the large lead time involved in said lay-up processes.

High deposition pre-preg material formats are known in the aeronautical field whose formats and technology reduce substantially the lay-up time for the composite structures. These high deposition pre-preg materials are pre-impregnated composite fibres materials where a thermoset polymer matrix material or a thermoplastic resin is already present. The technology design of these material formats allow a quick lay up of tapes (tows) of pre-preg material that are provided in a wider format (width of 2 inch or 50.8 mm), and in some cases, also thicker than the conventional standard pre-preg material formats.

The use of thicker high deposition pre-preg material formats for current laminate designs for lifting surfaces may result in failures at the edges of the laminate. The failures are known as edge effects or delaminations, and are related to the increase of interlaminar stresses towards the edges of the laminate. The edge effect is a consequence of the accumulation or grouping of material fibres non-parallel to the edge of the laminate in combination with the strain level at the edge area. Particularly, the edge effect may be more critical for the high cured ply thickness laminates, such as laminates manufactured with thicker high deposition pre-preg material formats.

SUMMARY

The present invention may be embodied as a composite laminate for an airframe lifting surface comprising a set of stacked plies of pre-preg material, the composite laminate being surrounded by at least an edge following an edge direction E along the composite laminate, the set of stacked plies comprising: (i) a first plurality of plies formed by tapes arranged parallel to the edge direction E, and (ii) a second plurality of plies formed by tapes arranged in a direction different to the edge direction E, wherein the thickness of at least one ply of the second plurality of plies is lower than the thickness of each ply of the first plurality of plies.

The composite laminate may be manufactured with high deposition pre-preg material formats that are laid up in the form of tapes in a same direction for each ply thus conforming such composite laminate. The lay-up of these pre-preg material formats may be performed by AFP.

The present composite laminate is surrounded or bounded on their lateral sides by edges at their ends, where at least one edge follows an edge direction E along the composite laminate that may include the total thickness of the set of stacked plies, defined between the ends of their lateral sides.

Unlike the conventional designs of composite airframe lifting surface laminate, the present invention provides a new laminate design for manufacturing composite airframe lifting surface with high deposition pre-preg material formats. So far, these materials have not been used to manufacture lifting surfaces due to the disadvantages caused by the edge effect. However, the present invention provides an improved design of a composite laminate which is compatible with the high deposition pre-preg material formats and avoids or reduces the edge effect.

Moreover, the decreased thickness of plies between both the first plurality of plies and the second plurality of plies, and compared with the prior art designs, advantageously reduces the edge effect on the composite laminate. That is, the edge effects due to thicker plies formed by the high deposition pre-preg material formats are prevented by the present design wherein the thickness of the plies the composite laminate are minimized between layers in comparison with the prior art laminate ply thickness. Further, this new design for composite laminate provides cost and lead time reduction thus allowing a high production rate.

The thickness of all the plies forming the second plurality of plies may be narrower than the thickness of each ply of the first plurality of plies. The thicknesses of each of first plurality of plies may be a uniform thickness; and the thickness of each of the second plurality of plies may be less than three-fourths of the uniform thickness.

Moreover, each of the directions of the tapes in the second plurality of plies is at an angle least twenty degrees from the edge direction.

The thickness of all the plies forming the first and the second plurality of plies may be, respectively, substantially the same.

The second plurality of plies of the composite laminate may be formed by tapes arranged in a direction orthogonal to the edge direction E. In this case, the first plurality of plies are formed by tapes arranged parallel to the edge direction E (which are referred to as 0° plies), and the second plurality of plies of the composite laminate are formed by tapes arranged in a direction orthogonal to the edge direction E (90° plies).

In a second embodiment, the first plurality of plies are formed by tapes arranged parallel to the edge direction E (0° plies), and the second plurality of plies of the composite laminate are formed by tapes arranged in a laying up direction of +45° with respect to the edge direction E.

In a third embodiment, the first plurality of plies are formed by tapes arranged parallel to the edge direction E (0°), and the second plurality of plies of the composite laminate are formed by tapes arranged in a laying up direction of −45° with respect to the edge direction E.

When using thinner plies, more quantity of plies have to be deposited to achieve the same total thickness of the laminate. The thinner plies may be distributed between the other plies to spread the interlaminar efforts through the entire laminate and reduce the criticality of border effects.

The second plurality of plies may distributed through the entire thickness (depth) of the composite laminate.

According to another embodiment, the first plurality of plies and the second plurality of plies are evenly (homogeneously) distributed through the thickness (depth) of the composite laminate.

In another particular embodiment, the set of stacked plies comprises: at least a first ply formed by tapes arranged parallel to the edge direction E, at least a second ply formed by tapes arranged in a direction orthogonal to the edge direction E, at least a third ply formed by tapes arranged in a laying up direction of +θ° with respect to the edge direction E, and at least a forth ply formed by tapes arranged in a laying up direction of −θ with respect to the edge direction E; wherein θ is in a range of 0 to 90 degrees.

Thus, the first ply is laid up in a laying up direction that is parallel to the edge direction E, the second ply is laid up in a laying up direction of 90° with respect to the edge direction E; the third ply is laid up in a laying up direction of +θ° with respect to the edge direction E; and the third ply is laid up in a laying up direction of −θ° direction with respect to the edge direction E. In a particular embodiment, θ is 45.

In another particular embodiment, the plies of both the first and second plurality of plies are interspersed through the thickness (depth) of the set of stacked plies. The expression "interspersed" will be understood, for example, as positioning, by order of stacking, first plies formed by tapes arranged parallel to a particular direction, the first plies being interposed between second plies formed by tapes arranged in a direction different to the particular direction.

In another particular embodiment, the thickness of the plies of the second plurality of plies is comprised between 0.184 mm and 1 mm.

In a more particular embodiment, wherein the 50% of the plies of the set of stacked plies corresponds to the first plurality of plies, the 33% of the plies of the set of stacked plies corresponds to the third and fourth plies of the second plurality of plies, and the 17% of plies of the stacked plies corresponds to the second plies of the second plurality of plies.

The invention may be embodied in an airframe lifting surface comprising a composite laminate according to the first inventive aspect. The airframe lifting surface may include stiffening elements, such as stringers, spars, beams, the stiffening elements being bonded to the composite laminate by an adhesive, such as an adhesive line. The airframe lifting surface may be one of a: torsion box, horizontal tail plane, vertical tail plane, rudder, elevator, aileron, spoiler or flap. Further, the invention may be embodied an aircraft comprising a composite airframe lifting surface.

The invention may be embodied as a method for manufacturing a composite laminate for an airframe lifting surface according to the first inventive aspect, the method comprising the steps of: laying up pre-preg material forming a set of stacked plies; curing the set of stacked plies, and obtaining a composite laminate for an airframe lifting surface in the form of a cured composite laminate; wherein the cured composite laminate is surrounded by at least an edge, the edge following an edge direction E along the composite laminate;

The step of laying up the pre-preg material may include: a first plurality of plies with tapes laid up in the edge direction E, and a second plurality of plies, each ply with tapes laid up in a laying up direction different to the edge direction E; and the thickness of at least one ply of the second plurality of plies is lower than the thickness of each ply of the first plurality of plies.

The present method provides a composite laminate with a reduced lamination effect at the edges of the composite laminate.

In a particular embodiment, the step of laying up pre preg material may be performed by an Automated Fibre Placement (AFP) wherein the fibre of the pre-preg material is laid up in a particular direction for each ply according to the present invention.

The step of laying up the pre preg material may provide a composite laminate in a fresh state in the form of fresh stack of plies.

The step of laying up the pre preg material may comprise laying up: tapes in a laying up direction parallel to the edge direction E for forming at least a first ply, tapes in a laying up direction orthogonal to the edge direction E for forming at least a second ply, tapes in a laying up direction of +θ° with respect to the edge direction E for forming at least a third ply i, and tapes in a laying up direction of −θ° with respect to the edge direction E for forming at least a forth ply, wherein θ is in a range of 0 to 90 degrees.

In a fifth inventive aspect, the present invention provides a method for manufacturing an airframe lifting surface according the second inventive aspect, the method comprising the following steps: providing at least a composite laminate according to the first inventive aspect, providing stiffening elements, joining the stiffening elements to the composite laminate, and obtaining the airframe lifting surface.

In a particular embodiment, the step of joining the stiffening elements may comprise co-bonding the stiffening elements to the cured composite laminate by means of an adhesive line.

In a particular embodiment, the of joining the stiffening elements may comprise co-curing the set of stacked plies with stiffening elements or other structural components in a same curing cycle.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from the disclosed embodiments of the invention, given just as examples and not being limited thereto, with reference to the drawings.

DETAILED DESCRIPTION

The present invention provides an improved composite laminate design for an aircraft airframe lifting surface manufactured with high deposition pre-preg material formats.

Airframe Lifting Surface

Figure 1:
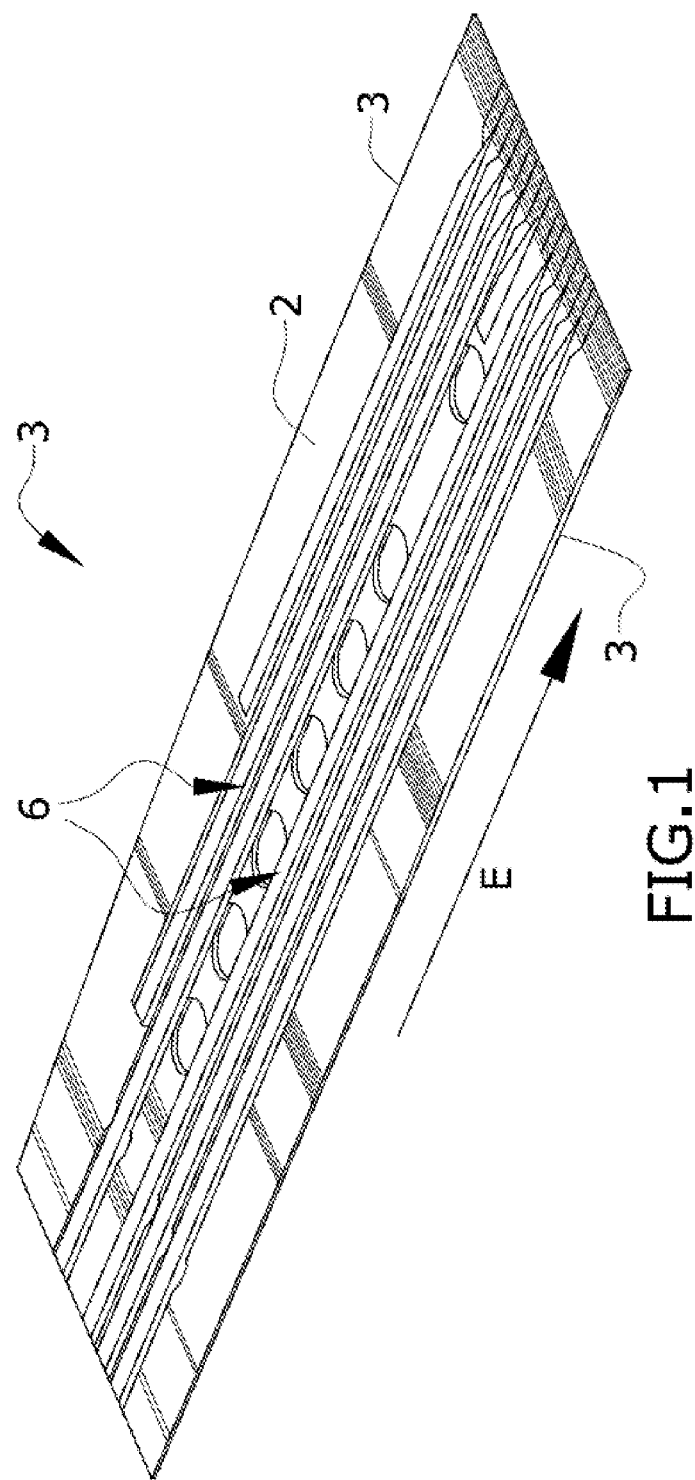
FIG. 1 shows a perspective view of an airframe lifting surface according to a particular embodiment of the present invention.

FIG. 1 shows a perspective view of an interior side of an airframe lifting surface that comprises a composite laminate (2) comprising a set of stacked plies (10) made of high deposition pre-preg material formats. A plurality of edges (3) bounds the composite laminate (2) as it can be observed in this figure. Each edge (3) defines an edge direction E along the end of the composite laminate, that is, each edge (3) follows an edge direction E along the composite laminate (2).

Figure 3:
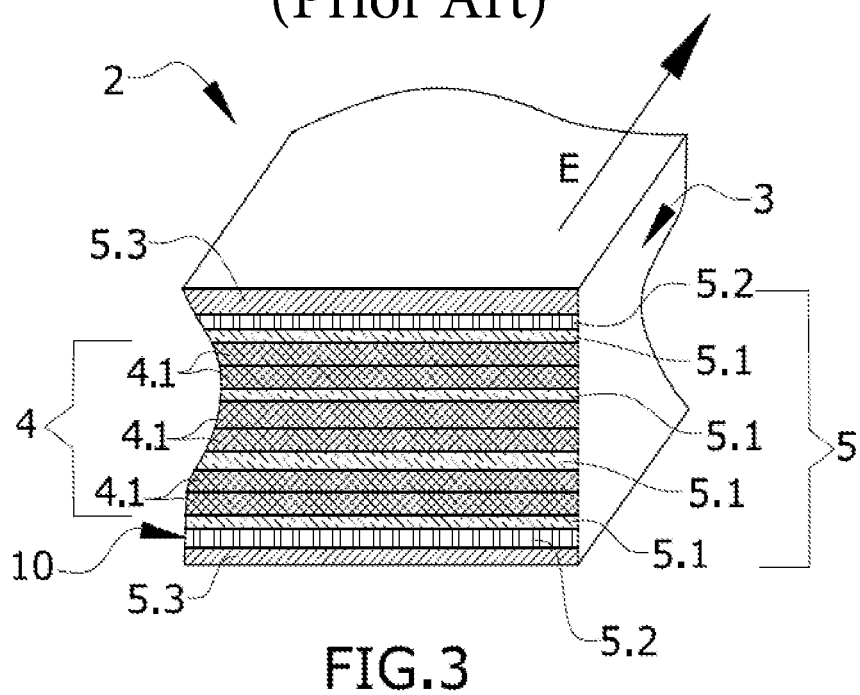
FIG. 3 shows a schematic representation of a composite laminate for an airframe lifting surface according to an embodiment of the present invention.

As shown in FIG. 3, the lifting surface (1) includes a composite laminate (2) that comprises a first plurality (4) of plies formed by tapes that are laid up parallel to the depicted edge direction E, and a second plurality (5) of plies formed by tapes that are laid up in a direction different to the depicted edge direction E. Particularly, the plies (5.1, 5.2, 5.3) that are laid up in a direction different to the edge direction E have a thickness that is lower than the thickness of the plies (4.1) that are laid up in the edge direction E. The new design of composite laminate (2) provides a decrease in the thickness of some of the plies as compared to state of the art if high deposition pre-preg material formats.

The airframe lifting surface shown in FIG. 1 further comprises a plurality of stiffening elements (6), e.g. stringers, located along an upper surface of the composite laminate (2) and bonded to such composite laminate surface. The stiffening elements (6) may be co-cured with a fresh set of stacked plies (10) of the composite laminate (2). In another example, the stiffening elements (6) are co-bonded with a cured composite laminate (2). In another example, the stiffening elements (6) are bonded to the composite laminate (2) by an adhesive line.

Composite Laminate (2)

Figure 2:
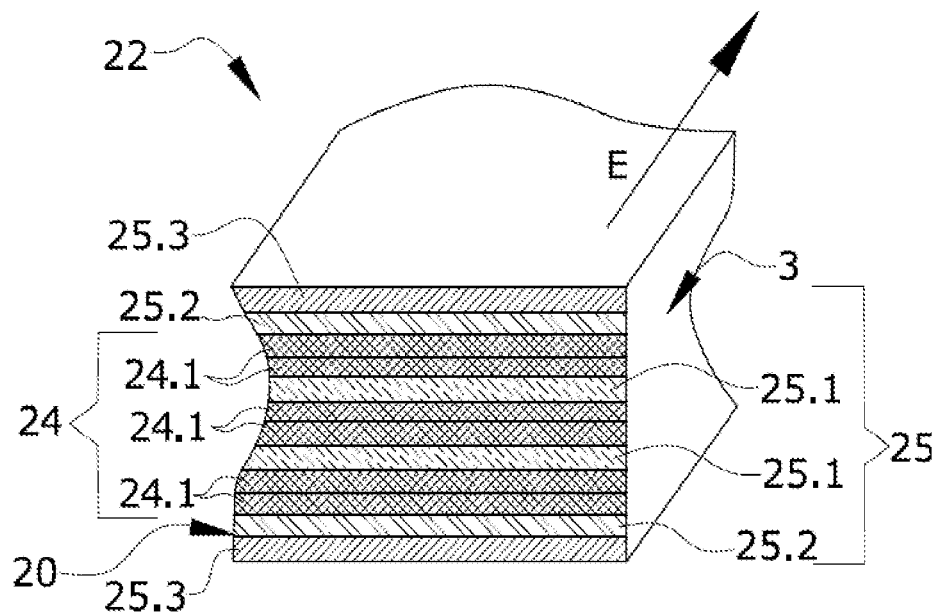
FIG. 2 shows a schematic representation of a composite laminate for an airframe lifting surface according to the state of the art.

FIGS. 2 and 3 show a schematic cross sectional view of a composite laminate (2, 22) composed by a plurality of stacked plies forming a set of stacked plies (10, 20) of high deposition pre-preg material formats. In particular, a prior art design according to FIG. 2 is compared to the new design shown in FIG. 3.

FIG. 2 shows a prior art design wherein the composite laminate (22) is composed by a set of stacked plies (20) each with the same thickness. These plies (20) are formed by tapes that are laid up, for each ply, in either a direction parallel to the edge direction E or in a direction different to the edge direction E. In this particular example, the composite laminate (22) comprises in order of laying up the following plies formed by tapes arranged according to a particular direction with respect to the edge direction E: (i) a fourth ply (25.3) formed by tapes that are laid up in a −45° direction, (ii) a third ply (25.2) formed by tapes that are laid up in a +45° direction, (iii) two first plies (24.1) formed by tapes that are laid up parallel to the edge direction E (0° plies), (iv) a second ply (25.1) formed by tapes that are laid up in a direction orthogonal to the edge direction E (90° plies), (v) two first plies (24.1) formed by tapes that are laid up parallel to the edge direction E (0° plies), (vi) a third ply (25.1) formed by tapes that are laid up in a direction orthogonal to the edge direction E (90° plies), (vii) (two first plies (24.1) formed by tapes that are laid up parallel to the edge direction E (0° plies), (viii) a third ply (25.2) formed by tapes that are laid up in a +45° direction, and (ix) a fourth ply (25.3) formed by tapes that are laid up in a −45° direction.

The above design, corresponding to the prior art, would experience the edge effect or delamination on the edges (30) of the composite laminate (20) since the application of high deposition material formats for manufacturing an airframe lifting surface.

FIG. 3 shows a new composite laminate design (2) wherein the composite laminate (2) is composed by a set of stacked plies (10) with different thickness. The plies (10) are formed by tapes that are laid up in either a direction parallel to the edge direction E or in a direction different to the edge direction E. In this particular example (shown in FIG. 3), the composite laminate (2) comprises in order of laying up the following plies formed by tapes arranged according to a particular direction with respect to the edge direction E: (i) a forth ply (5.3) formed by tapes that are laid up in a −45° direction, (ii) a third ply (5.2) formed by tapes that are laid up in a +45° direction, (iii) a second ply (5.1) formed by tapes that are laid up in a direction orthogonal to the edge direction E, (iv) two first plies (4.1) formed by tapes that are laid up parallel to the edge direction E, (v) a second ply (5.1) formed by tapes that are laid up in a direction orthogonal to the edge direction E, (vi) two first plies (4.1) formed by tapes that are laid up parallel to the edge direction E, (vii) a second ply (5.1) formed by tapes that are laid up in a direction orthogonal to the edge direction E, (viii) two first plies (4.1) formed by tapes that are laid up parallel to the edge direction E, (ix) a second ply (5.1) formed by tapes that are laid up in a direction orthogonal to the edge direction E, (x) a third ply (5.2) formed by tapes that are laid up in a +45° direction, and (xi) a forth ply (5.3) formed by tapes that are laid up in a −45° direction.

To reduce or even avoid the edge effect or delamination of the composite laminate (2), the thickness of the plies that are laid up in a direction different to the edge direction E is reduced compared to the prior art laminate shown in FIG. 2. Particularly, the thicknesses of the second plies (5.1) may be 0.184 mm to 1 mm and is reduced as compared to the thicknesses of the plies (4.1) and as compared to the second plies (25.1) of the prior art design shown in FIG. 2. In addition, the new design also includes two more second plies (5.1) formed by tapes that are laid up in a direction orthogonal to the edge direction E. Furthermore, the thickness of the third plies (5.2) and the fourth plies (5.3) is reduced as compared to the thicknesses of the first plies (4.1) and as compared to the plies (25.1) in the prior art design shown in FIG. 2. The thicknesses of each of the second, third and fourth plies (5.1, 5.2 and 5.3) may be three fourths, two-thirds, one-half, one-third or one-quarter, the thickness of any one of the thicknesses of the first plies (4.1). Moreover, the thicknesses of the first plies (4.1) may be uniform for each of the plies. Similarly, the thickness of each of the second plies (5.1) may be uniform for each of the plies, and the thickness of each of the fourth plies (5.3) may be uniform. Moreover, the thicknesses of the second plies (5.1) may be uniform with the thicknesses of each of the third plies (5.2) and the fourth plies (5.3). In an alternate approach, the thicknesses of the second plies (5.1) may be smallest at the second plies (5.1) at or near the center of the composite laminate (2) and may be thicker towards the upper or lower surface of the composite laminate. Similarly, the third and fourth plies (5.2 and 5.3) which are positioned towards the upper or lower surfaces of the composite laminate may be thicker than the second plies (5.1) which are positioned towards the center of the composite laminate.

Therefore, in the composite laminate (2) design shown in this FIG. 3, the thickness of each cured ply where the tapes are arranged in a direction different to the edge direction E is lower than the thickness of each cured ply where the tapes are arranged parallel to the edge direction E.

In a particular example, the 50% of the plies of the set of stacked plies (10) corresponds to first plies (4.1) formed by tapes parallel to the edge direction E; the 33% of the plies corresponds to third and fourth plies (5.2, 5.3) formed by tapes in the laying up direction of ±45° with respect to the edge direction E; and the 17% of plies corresponds to the second plies (5.1) formed by tapes in a direction orthogonal to the edge direction E.

Method for Manufacturing a Composite Laminate (2)

The present invention may be embodied as a method for manufacturing a composite laminate (2) for an airframe lifting surface, the method comprising the steps of: (a) laying up pre-preg material forming a set of stacked plies (10), (b) curing the set of stacked plies (10) obtained in the step a), and (c) obtaining a composite laminate (2) for an airframe lifting surface in the form of a cured composite laminate (2); wherein the cured composite laminate (2) obtained in the step c) is surrounded by at least an edge (3), the edge (3) following an edge direction E along the composite laminate (2);

The step (a) of laying up pre-preg material may comprise laying up at least: (i) a first plurality (4) of plies (4.1) with tapes laid up in the edge direction E, and (ii) a second plurality (5) of plies (5.1, 5.2, 5.3), each ply (5) with tapes laid up in a laying up direction different to the edge direction E; and the thickness of each ply of the second plurality (5) of plies is lower than the thickness of each ply of the first plurality (4) of plies.

The step (a) of laying up the pre-preg material may comprise laying up high deposition pre-preg material formats in the form of tapes (4) that makes up each ply of a plurality of stacked plies (10). According to at least an edge (3) of the composite laminate (2), in the step of laying up, some plies are laid up in the edge direction E and other plies are laid up in a direction different to the edge direction E.

In a particular example, some plies are laid up in a laying up direction of ±45° direction with respect to the edge direction E; other plies are laid up in another laying up direction that is orthogonal to the edge direction E, and some other plies are laid up in a direction that is parallel to the edge direction E.

The thickness of the laid up plies is a particular thickness for each ply so that the thickness of the plies formed by tapes that are laid up in a direction different to the edge direction E is lower than the thickness of the plies formed by tapes that are laid up in the edge direction E. That is, according to the edge (3) of the composite laminate (2) and both its edge direction E and the laying up direction of each ply, the thickness of the laid up tapes varies for each ply respectively in view of the prior art solutions.

In a particular example, after a cured composite laminate (2) is obtained, the method further comprises trimming the composite laminate (2) at its edges (3) in order to obtain the desired form.

Method for Manufacturing an Airframe Lifting Surface

The present invention provides a method for manufacturing an airframe lifting surface comprising the following steps: (a) providing at least a composite laminate (2), (b) providing stiffening elements (6), (c) joining the stiffening elements (6) to the composite laminate (2), and (d) obtaining the airframe lifting surface.

The cured composite laminate (2), may be joined to at least a stiffening element (6) by a co-bonding process wherein the stiffening element (6) is bonded to the composite laminate (2) by an adhesive line.

In another particular example, the set of stacked plies (10), in the form of a fresh composite laminate, is joined to at least a stiffening element (6) and both components are cured together in a same curing cycle by means of a co-curing process.

Aircraft

Figure 4:
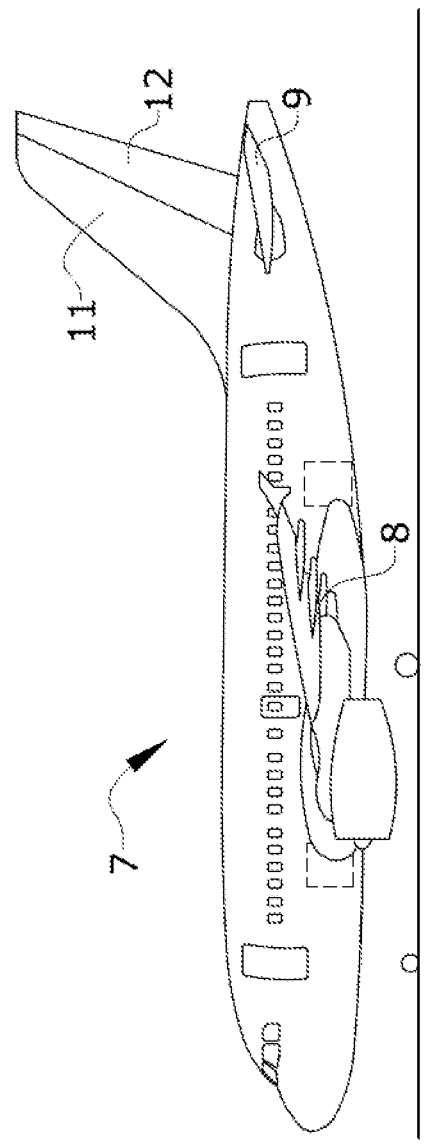
FIG. 4 shows an aircraft according to an embodiment of the present invention.

FIG. 4 shows an aircraft (7) comprising a plurality of airframe lifting surfaces corresponding to a wing torsion box (8), a horizontal tail plain (9), a vertical tail plain (11) and a rudder (12). These airframe lifting surfaces (1) are manufactured from a composite laminate (2).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a composite laminate for an airframe lifting surface, the method comprising:
    laying up pre-preg material to form a set of stacked plies, wherein the set of stacked plies has an edge following an edge direction, and wherein the laying up includes:
        laying up a plurality of first plies one ply on another by arranging tapes of the pre-preg material parallel to the edge direction to form a first layer of a first plurality of the first plies, a second layer of a second plurality of the first plies, and a third layer of a third plurality of the first plies, and
        laying up a plurality of second plies by arranging tapes of the pre-preg material in one or more directions which are non-parallel to the edge direction, wherein a thickness of each of the second plurality plies is smaller than a thicknesses of each of the first plies, and wherein one ply of the second plies is sandwiched between the first and second layers, and another one ply of the second plies is sandwiched between the second and third layers;
    curing the set of stacked plies, and
    forming the composite laminate for the airframe lifting surface from the cured composite laminate.

2. The method according to claim 1, wherein the laying up of the plurality of the second plies includes arranging the tapes in a direction orthogonal to the edge direction, and the method includes:
    laying up a third ply with tapes of the pre-preg material oriented at an acute angle with respect to the edge direction, and laying up a fourth ply with tapes of the pre-preg material oriented at an obtuse angle with respect to the edge direction, wherein the third ply and fourth ply form outer layers of the composite material, and wherein the thickness of each of the first plies is greater than a thickness of the third ply and of the fourth ply.

3. The method according to claim 1, further comprising:

joining at least one stiffening element to the composite laminate, and forming the aircraft lifting surface from the composite laminate with the joined at least one stiffening element.

4. The method according to claim 3, wherein the joining of the at least one stiffening element to the composite laminate includes co-bonding the at least one stiffening element to the cured composite laminate by an adhesive line.

5. The method according to claim 3, further comprising joining at least one stiffening element to the stacked plies, and the step of curing the stacked plies includes curing the stacked piles with the at least one stiffening element.

6. The method of claim 1, wherein the non-parallel arrangement of the second plies is orthogonal to the edge direction.

7. The method of claim 1, wherein the non-parallel arrangement of the second plies is positive or negative 45 degrees with respect to the edge direction.

8. The method of claim 1, wherein the second plies are distributed throughout the thickness of the composite laminate.

9. The method of claim 1, wherein the thicknesses of each of the second plies are in a range of 0.184 mm to 1 mm.

10. The method of claim 1, wherein the airframe lifting surface is at least one of a torsion box, horizontal tail plane, vertical tail plane, rudder, elevator, aileron, spoiler and flap.

11. The method of claim 1, wherein each of the first plies have a uniform thickness; and the thickness of each of the second plies is less than three-fourths of the uniform thickness.

12. The method of claim 1, wherein the non-parallel arrangement of each of the second plies is at an angle of at least twenty degrees with respect to the edge direction.

13. A method to form a composite laminate having an edge direction for an airframe lifting surface, the method comprising:

forming a middle section of the composite laminate by laying up first plies of a pre-impregnated composite fiber material to form a first layer, a second layer and a third layer of the first plies, continuing forming the middle section by laying up a second ply of the pre-impregnated composite fiber material between the first and second layers, and a third ply of the pre-impregnated composite material between the second and third layers, wherein each of the first plies are formed of tows parallel to the edge direction, and the second and third plies are each formed of tows oriented at an angle other than parallel to the edge direction;

forming a first outer section of the composite laminate by laying up a fourth ply of a pre-impregnated composite fiber material formed of tows oriented along a direction at an angle other than zero to the edge direction, forming a second outer section of the composite laminate by laying up a fifth ply of a pre-impregnated composite material and formed of tows oriented along a direction at an angle other than zero to the edge direction, stacking the first outer section, the middle section and the second outer section to form a set of stacked of plies, wherein the middle section is sandwiched between the first outer section and the second outer section, curing the set of stacked plies, and forming the composite laminate for the airframe lifting surface from the cured set of stacked plies, wherein the first outer section forms a first outer surface of the composite laminate and the second outer section forms a second outer surface of the composite laminate, wherein the first plies each have a thickness greater than a thickness of each of the second, third, fourth and fifth plies.

14. The method of claim 13, wherein the direction of the tows of the second and third plies is orthogonal to the edge direction.

15. The method of claim 13, wherein the direction of the tows of the fourth and fifth plies is at 45 degrees to the edge direction.

\* \* \* \* \*